(12) United States Patent
Hu et al.

(10) Patent No.: US 12,550,169 B2
(45) Date of Patent: Feb. 10, 2026

(54) METHODS AND DEVICES FOR SYNCHRONIZING UPLINK SLOT NUMBER IN SIDELINK COMMUNICATION

(71) Applicant: ZTE Corporation, Shenzhen (CN)

(72) Inventors: Yuzhou Hu, Shenzhen (CN); Youxiong Lu, Shenzhen (CN); Shuanghong Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 571 days.

(21) Appl. No.: 18/091,497

(22) Filed: Dec. 30, 2022

(65) Prior Publication Data

US 2023/0217469 A1 Jul. 6, 2023

Related U.S. Application Data

(63) Continuation of application No. PCT/CN2020/100106, filed on Jul. 3, 2020.

(51) Int. Cl.
*H04W 72/40* (2023.01)
*H04W 72/02* (2009.01)
*H04W 72/0446* (2023.01)

(52) U.S. Cl.
CPC ........... *H04W 72/40* (2023.01); *H04W 72/02* (2013.01); *H04W 72/0446* (2013.01)

(58) Field of Classification Search
CPC .................. H04W 72/40; H04W 72/02; H04W 72/0446
See application file for complete search history.

(56) References Cited

U.S. PATENT DOCUMENTS

| | | | |
|---|---|---|---|
| 2016/0174179 A1 | 6/2016 | Seo et al. | |
| 2017/0230959 A1 | 8/2017 | Shuanshuan et al. | |
| 2019/0098590 A1 | 3/2019 | Nam et al. | |
| 2020/0059766 A1 | 2/2020 | Kim et al. | |
| 2021/0250910 A1* | 8/2021 | Park | H04L 5/0044 |

FOREIGN PATENT DOCUMENTS

| | | | | |
|---|---|---|---|---|
| CA | 3167466 A1 * | 8/2021 | ............ | H04W 72/20 |
| CN | 107211235 A | 9/2017 | | |
| CN | 108141340 A | 6/2018 | | |

(Continued)

OTHER PUBLICATIONS

International Search Report and Written Opinion regarding PCT/CN2020/100106 dated Apr. 1, 2021.

(Continued)

*Primary Examiner* — Saad A. Waqas
(74) *Attorney, Agent, or Firm* — Crowell & Moring LLP

(57) ABSTRACT

The present disclosure describes methods, system, and devices for synchronizing at least one number of uplink slots for a user equipment (UE) for a sidelink communication. The method includes determining, by a first UE, at least one number of uplink slots for the sidelink communication between the first UE and a second UE; and transmitting, by the first UE to the second UE, a physical sidelink broadcast channel (PSBCH) message comprising Z bits indicating a state index, Z being a positive integer. The Z bits in the PSBCH message are configured to specify to the second UE the at least one number of uplink slots for the sidelink communication.

15 Claims, 5 Drawing Sheets

---

500 determining, by a second UE, a first number (n1) of uplink slots in a first pattern and a second number (n2) of uplink slots in a second pattern from PSBCH sent by a first UE based based on at least one of: a state index from Z bits indicated in PSBCH, a slot indication Δ1, a slot indication Δ2, the slot indication Δ1 and Δ2, a periodicity in units of ms P, a periodicity indication Y, a non-negative integer corresponding to a subcarrier spacing (SCS) for the sidelink communication μ, or a granularity of resource indication w

510

(56) References Cited

FOREIGN PATENT DOCUMENTS

| CN | 111149382 A | 5/2020 | | |
|---|---|---|---|---|
| EP | 4048008 A1 | * | 8/2022 | ............ H04L 5/0053 |
| EP | 4057711 A1 | * | 9/2022 | ............ H04L 5/0048 |
| WO | WO 2020/065896 | | 9/2018 | |
| WO | WO2019054757 A1 | | 3/2019 | |
| WO | WO2020091547 A1 | | 5/2020 | |

OTHER PUBLICATIONS

CATT, "Test proposal from email discussion thread #01 for AI 7.2.4.3 sidelink synchronization mechanism," *3GPP TSG RAN WGI Meeting* #101 RI-2005099, Jun. 5, 2020.

CATT, "Feature lead summary #01 on AI 7.2.4.3 sidelink synchronization mechanism," *3GPP TSG RAN WGI Meeting* #101 RI-2003615, Jun. 5, 2020.

Japanese-language Notice of Allowance with English translation regarding Application No. 2022-580387 dated Feb. 21, 2025 (6 pages).

Korean-language Office Action with English summary of the Office Action regarding Korean Application No. 10-2022-7045826 dated Apr. 1, 2025 (6 pages).

Extended European Search Report regarding EP 20 942 773.1 dated Feb. 1, 2024, 8 gages.

CATT, "Feature lead summary on AI 7.2.4.3 #2 Sidelink synchronization Mechanism," 3GPP Draft; R1-2002396, 3rd Generation Partnership Project (3GPP), May 5, 2020, XP051881190, 26 pages.

Indian Patent Office First Examination Report regarding 2022-17074916 dated Feb. 5, 2024, 8 pages.

Japanese Office Action and English translation of Official Action regarding 2022-580387 dated Jan. 22, 2024, 7 gages.

Vivo, "Remaining issues on sidelink synchronization mechanism," 3GPP TSG RAN WG1 #101-e R1-2003381, Retrieved from the Internet: www.3gpp.org/ftp/tsg_ran/WG1_RL1/TSGR1_101-e/Docs/R1-2003381.zip May 16, 2020, 7 pages.

Qualcomm Incorporated, Synchronization Details for NR V2X, 3GPP TSG RAN WG1 #101-e R1-2004453, Retrieved from the Internet: www.3gpp.org/ftp/tsg_ran/WG1_RL1/TSGR1_101-e/Docs/R1-2004453.zip May 16, 2020, 4 pages.

ZTE, Sanechips, Remaining issues of synchronization, 3GPP TSG RAN WG1 #102-e R1-2005308, Retrieved from the Internet: /www.3gpp.org/ftp/tsg_ran/WG1_RL1/TSGR1_102-e/Docs/R1-2005308.zip Aug. 8, 2020, 8 pages.

Chinese Search Report and English translation regarding application No. 202080102715.1 dated Aug. 18, 2024, 5 pages.

First Chinese Office Action with English translation regarding 202080102715.1 dated Aug. 20, 2024, 23 pages.

Shao-Yu Lien et al., "3GPP NR Sidelink Transmissions Toward 5G V2X," IEEE Access, Feb. 13, 2020, pp. 1-33.

European Patent Office Office Action issued in Application No. 20 942 773.1 dated Sep. 12, 2025 (6 pages).

Korean-language Notice of Allowance with English summary issued in Korean Application No. 10-2022-7045826 dated Dec. 9, 2025, (8 pages).

CATT, "Feature lead summary #3 on AI 7.2.4.3 Sidelink synchronization mechanism-Email discussion outcomes," 3GPP TSG RAN WG1 Meeting #101, eMeeting, May 25-Jun. 5, 2020, R1-2003617, 5 pages.

* cited by examiner

400

```
┌─────────────────────────────────────────────────────────────────────┐
│ determining, by a first UE, at least one number of uplink slots for the sidelink │
│ communication between the first UE and a second UE;                 │
│                                                              410    │
└─────────────────────────────────────────────────────────────────────┘
                                    │
                                    ▼
┌─────────────────────────────────────────────────────────────────────┐
│ transmitting, by the first UE to the second UE, a physical sidelink broadcast channel │
│ (PSBCH) message comprising Z bits indicating a state index, Z being a positive │
│                              integer                                │
│                                                              420    │
└─────────────────────────────────────────────────────────────────────┘
```

FIG. 4

500 determining, by a second UE, a first number (n1) of uplink slots in a first pattern and a second number (n2) of uplink slots in a second pattern from PSBCH sent by a first UE based based on at least one of: a state index from Z bits indicated in PSBCH, a slot indication $\Delta 1$, a slot indication $\Delta 2$, the slot indication $\Delta 1$ and $\Delta 2$, a periodicity in units of ms P, a periodicity indication Y, a non-negative integer corresponding to a subcarrier spacing (SCS) for the sidelink communication $\mu$, or a granularity of resource indication w

METHODS AND DEVICES FOR SYNCHRONIZING UPLINK SLOT NUMBER IN SIDELINK COMMUNICATION

CROSS-REFERENCE TO RELATED APPLICATION

This application is a continuation application of PCT International Patent Application No. PCT/CN2020/100106, filed with the China National Intellectual Property Administration, PRC on Jul. 3, 2020, which is herein incorporated by reference in its entirety.

TECHNICAL FIELD

The present disclosure is directed generally to wireless communications. Particularly, the present disclosure relates to methods and devices for synchronizing uplink slot numbers in sidelink communication.

BACKGROUND

Wireless communication technologies are moving the world toward an increasingly connected and networked society. User equipment (UE) in a wireless network may communicate data with one another via direct sidelink communication channels without the data being relayed by any wireless access network nodes. Some application scenarios of sidelink communications such as those involving vehicular wireless network devices may have communication requirements that are more stringent and unpredictable compared to other conventional applications involving UE-UE sidelink communications. It is critical to provide a resource allocation and provisioning mechanism to enable synchronization of uplink slot numbers in sidelink communication for efficient use of both sidelink communication resources and control resources.

SUMMARY

This document relates to methods, systems, and devices for wireless communication, and more specifically, for synchronizing uplink slot numbers in sidelink communication.

In one embodiment, the present disclosure describes a method for wireless communication. The method includes synchronizing at least one number of uplink slots for a user equipment (UE) for a sidelink communication by: determining, by a first UE, at least one number of uplink slots for the sidelink communication between the first UE and a second UE; and transmitting, by the first UE to the second UE, a physical sidelink broadcast channel (PSBCH) message comprising Z bits indicating a state index, Z being a positive integer, wherein the Z bits in the PSBCH message are configured to specify to the second UE the at least one number of uplink slots for the sidelink communication.

In another embodiment, the present disclosure describes a method for wireless communication. The method includes determining, by a second UE, a first number (n1) of uplink slots in a first pattern and a second number (n2) of uplink slots in a second pattern from PSBCH sent by a first UE based on at least one of: a state index from Z bits indicated in PSBCH, a slot indication $\Delta 1$, a slot indication $\Delta 2$, the slot indication $\Delta 1$ and $\Delta 2$, a periodicity in units of ms P, a periodicity indication Y, a non-negative integer corresponding to a subcarrier spacing (SCS) for the sidelink communication $\mu$, or a granularity of resource indication w.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS

FIG. 4 shows a flow diagram of a method for wireless communication.

FIG. 5 shows a flow diagram of a method for wireless communication.

DETAILED DESCRIPTION

Figure 1:
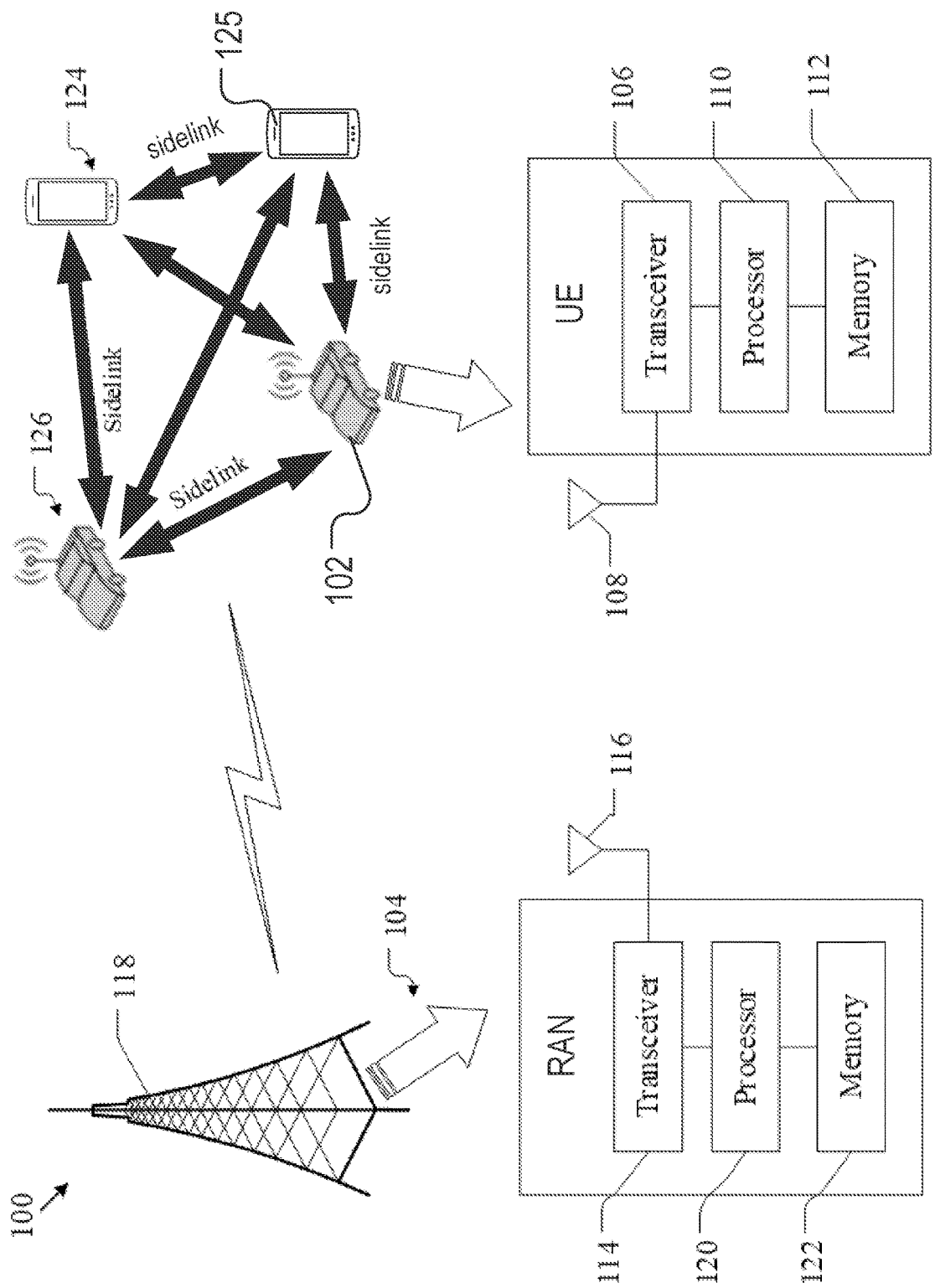
FIG. 1 shows an example of a wireless communication system.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and devices for synchronizing uplink slot numbers in sidelink communication.

Next generation (NG), or 5th generation (5G), wireless communication may provide a range of capabilities from downloading with fast speeds to support real-time low-latency communication. New generation (NG) mobile communication system are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfil the requirements from different industries and users.

To address some of the drawbacks of the existing communication system and/or improve the efficiency of communication system, a user equipment (UE) may directly communicate with another UE without going through a wireless node, for example, a UE directly transmits data to another UE via a sidelink transmission. An actually wireless node may not know a resource utilization rate because sidelink transmission is from one UE to another UE directly without going through the wireless node. The present disclosure describe a method and device addressing the questions of how to synchronize the number of uplink slots in sidelink communication. In one implementation, the wireless node may be a radio access network (RAN), or a next generation NodeB (gNB).

5G network is expected to provide high speed, low latency and ultra-reliable communication capabilities and fulfil the requirements from different industries and users. V2X is one of tele-communicational protocols and data exchange standardizations. It may work in various implementations. In one implementation, a communication may perform wireless communication and information exchange between vehicle to vehicle (V2V). In another implementation, a communication may perform wireless communication and information exchange from vehicle to pedestrian (V2P). In another implementation, a communication may perform wireless communication and information exchange from vehicle to infrastructure (V2I). Based on V2X technology, the vehicle may provide a safer driving conditions, a more expedite traffic situation, as well as more convenience and entertainment.

Vehicle network including the terminal devices or user equipments (UEs) may heavily rely on sidelink communication in the network. Sidelink communication, as used in this disclosure, refers to a direct wireless information exchange between UEs. For example, V2X communication may rely on direct sidelink data exchange from a source UE to a destination UE via an air interface without forwarding by any wireless base station.

The application scenarios for V2X communication via sidelink communication has increasingly expanded and diversified. Advanced V2X services and applications include but are not limited to vehicle platooning, extended sensors, semi-autonomous driving, fully autonomous driving, and remote driving. These applications and services require increasingly higher network performance including broader bandwidth, lower latency, and higher reliability.

While being capable of communicating among themselves using sidelinks, the various UEs described above may be also connected to wireless access networks, and to a core network via the access networks. The wireless access network and core network may be involved in configuring and provisioning communication resources needed for data and control information transmission/reception for sidelink communication. An example wireless access network may be based on, for example, cellular 4G LTE or 5G NR technologies and/or formats.

FIG. 1 shows an example system diagram of a wireless access communication network 100 including more than one UEs (for example, 102, 124, 125, and 126) as well as a wireless access network node (for example, a radio access network (RAN)) 104. Each of the UEs 102, 124, 125, and 126 may include but is not limited to a mobile phone, a smartphone, a tablet, a laptop computer, a vehicle on-board communication equipment, a roadside communication equipment, a sensor device, a smart appliance (such as a television, a refrigerator, and an oven), or other devices that are capable of communicating wirelessly over a network. The UEs may indirectly communicate with each other via the RAN 104 or directly via sidelinks.

Taking UE 102 as an example, referring to FIG. 1, UE 102 may include transceiver circuitry 106 coupled to an antenna 108 to effectuate wireless communication with the RAN 104 or with other UEs such as UE 124, 125, or 126. The transceiver circuitry 106 may also be coupled to a processor 110, which may also be coupled to a memory 112 or other storage devices. The memory 112 may store therein computer instructions or code which, when read and executed by the processor 110, cause the processor 110 to implement various ones of the methods for sidelink resource allocation/configuration and data transmission/reception described herein.

Similarly, the RAN 104 may include a base station or other wireless network access points capable of communicating wirelessly over a network with one or more UEs. For example, the RAN 104 may be implemented in the form of a 4G LTE base station, a 5G NR base station, a 5G central-unit base station, or a 5G distributed-unit base station. Each type of the RAN may be configured to perform a corresponding set of wireless network functions. The RAN 104 may include transceiver circuitry 114 coupled to an antenna 116, which may include an antenna tower 118 in various forms, to effectuate wireless communications with the UEs 102, 124, 125, and 126. The transceiver circuitry 114 may be coupled to one or more processors 120, which may further be coupled to a memory 122 or other storage devices. The memory 122 may store therein instructions or code that, when read and executed by the processor 120, cause the processor 120 to implement various functions. These functions, for example, may include those related to the configuration and provisioning of wireless communication resources used for exchange of data and control information in sidelink communication between the UEs.

In some embodiments, transforming numbers of UL slots (n1, n2) in both patterns into the state index may be indicated by Z bits in a physical sidelink broadcast channel (PSBCH) content. When single pattern is configured, the transformation is done by transforming the decimal number of UL slots into the bit indication. When two patterns are configured, the indication is done by representing the state index with Z bits using a floor operation to the results of n1 and n2 divided by w, wherein w may be determined by a table. In one implementation, when two patterns are configured, the indication may be done with a floor operation floor( ). However, from receiving UE's perspective, it's ambiguous to retrieve the (n1,n2) with the received Z bits.

The present disclosure describes some solutions with synchronizing at least one number of uplink slots for a user equipment (UE) for a sidelink communication, addressing at least a part of the above issues.

Figure 2:
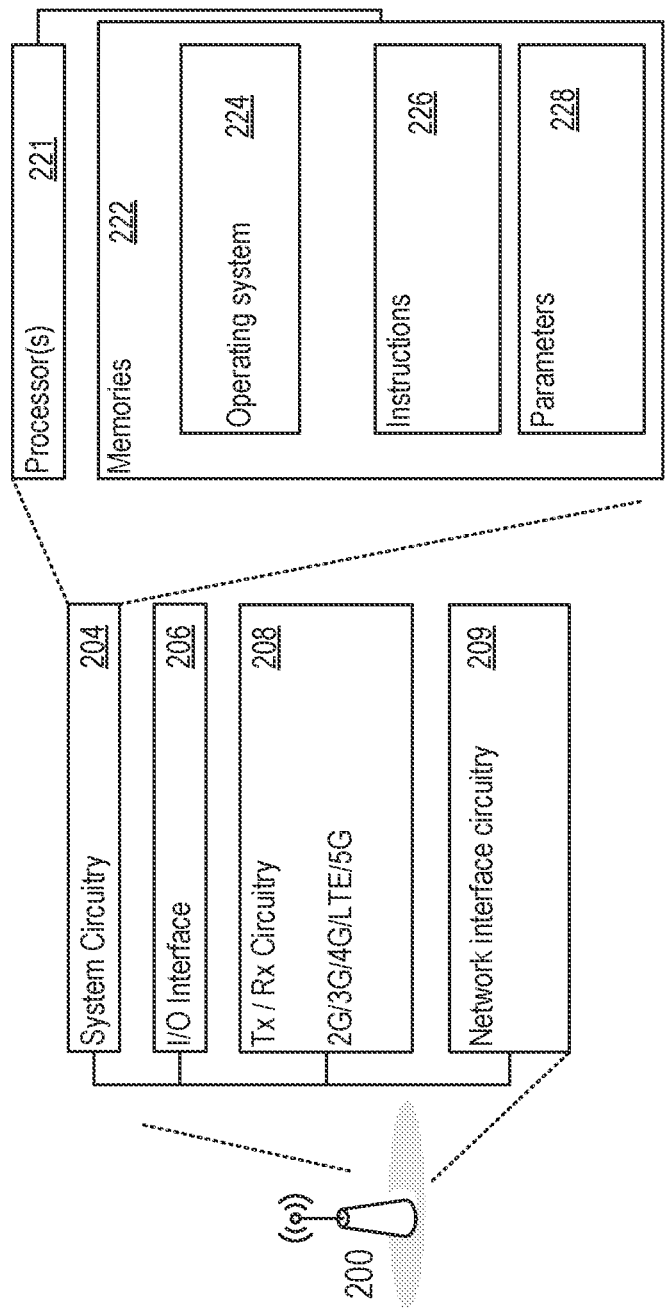
FIG. 2 shows an example of a wireless network node.

FIG. 2 shows an exemplary of a radio access network or a wireless communication base station 200. The base station 200 may include radio transmitting/receiving (Tx/Rx) circuitry 208 to transmit/receive communication with one or more UEs, and/or one or more other base stations. The base station may also include network interface circuitry 209 to communicate the base station with other base stations and/or a core network, e.g., optical or wireline interconnects, Ethernet, and/or other data transmission mediums/protocols. The base station 200 may optionally include an input/output (I/O) interface 206 to communicate with an operator or the like.

The base station may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the base station. The parameters 228 may include parameters to support execution of the instructions 226. For example, parameters may include network protocol settings, bandwidth parameters, radio frequency mapping assignments, and/or other parameters.

Figure 3:
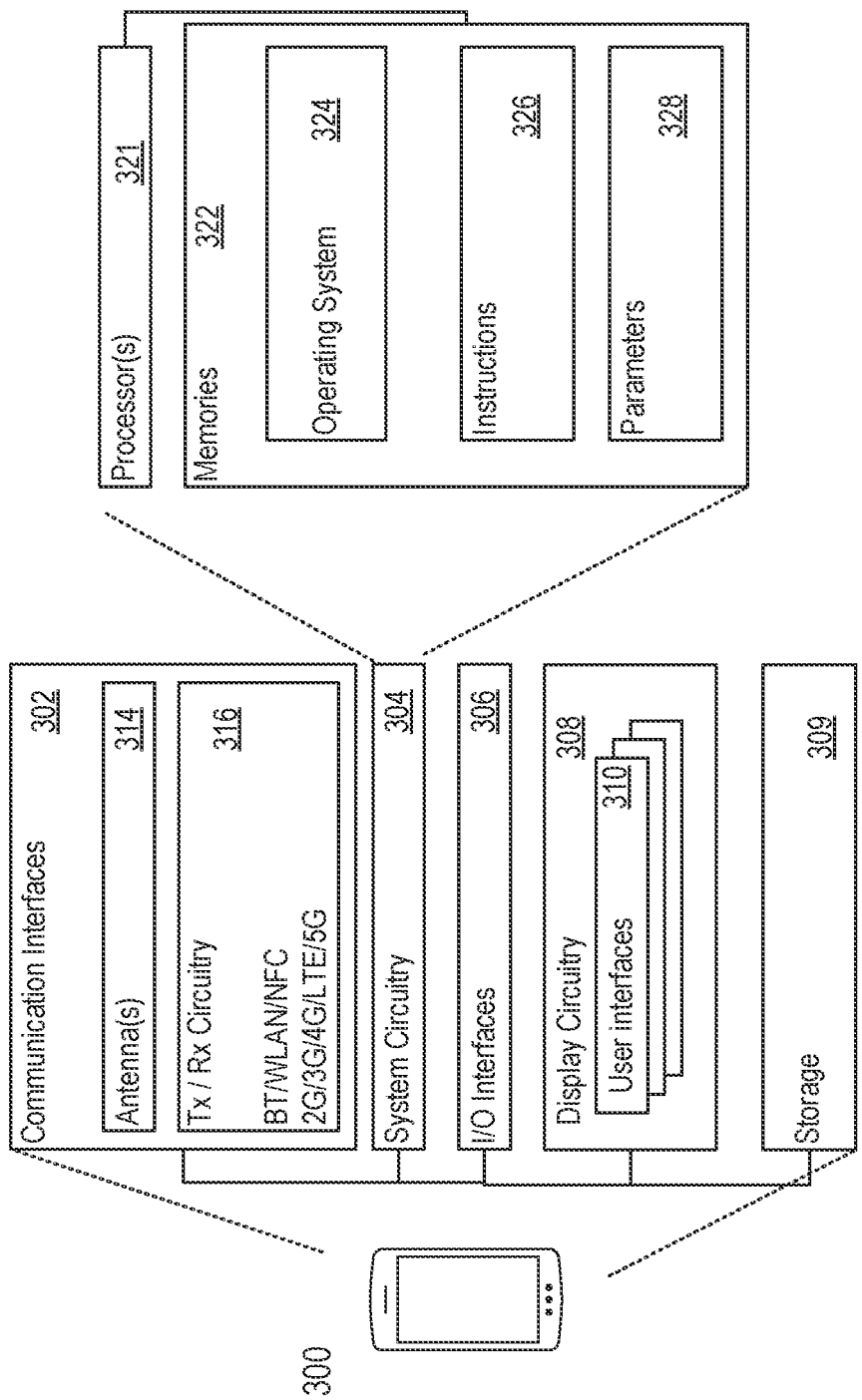
FIG. 3 shows an example of a user equipment.

FIG. 3 shows an exemplary user equipment (UE) 300. The UE 300 may be a mobile device, for example, a smart phone or a mobile communication module disposed in a vehicle. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, preamplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes several embodiments of methods and devices for synchronizing at least one number of uplink slots for a user equipment (UE) for a sidelink communication, which may be implemented, partly or totally, on the wireless network base station and/or the user equipment described above in FIGS. 2 and 3.

In some embodiments, a number of slots indicated in PSBCH may be realized with 7 bits to represent the same meaning as the uplink (UL) slots indication that is included in tdd-UL-DL-ConfigurationCommon, which may be configured as a single pattern or a dual pattern corresponding to a plurality of combinations, for example but not limited to, approximately 64 combinations.

In one implementation, when tdd-UL-DL-ConfigurationCommon is configured as 2 patterns, there are two levels of indication each pattern when it comes to 2 patterns. There are a number of UL slots u_slots and number of UL symbols u_sym. A first number (n1) of uplink slots is for a first pattern (Pattern 1) and a second number (n2) of uplink slots is for a second pattern (Pattern 2). The first number (n1) and the second number (n2) may be determined by the following:

n1=u_slots1+r1, wherein r1 may be one of {0.1} and be a function of u_sym1; and n2=u_slots2+r2, wherein r2 can be one of {0,1} and be a function of u_sym2.

From a receiver's perspective, since r1=0 or 1 may lead to the same n and the receiver needs to determine whether r1=0 or 1. Some mechanisms may be used to determine the value of r1.

In another implementation in coverage on the frequency used for the NR sidelink communication, inCoverage is set to be true. In response to the tdd-UL-DL-Configuration-Common is included in the received system information block type 1 (SIB1), sl-TDD-Config. is set to the value representing the same meaning as that is included in tdd-UL-DL-ConfigurationCommon. In response to the tdd-UL-DL-ConfigurationCommon is not included in the SIB1, sl-TDD-Config. is set to none.

In another implementation, for transmission of a sidelink (SL) synchronization signals (S-SS)/PSBCH block, a UE includes a bit sequence $a_0, a_1, a_2, a_3, \ldots, a_{11}$ in the PSBCH payload to indicate sl-TDD-Config. and provide a slot format over a number of slots, wherein $a_0=0$ if pattern 1 is provided by tdd-UL-DL-ConfigurationCommon; and $a_0=1$ if both pattern 1 and pattern 2 are provided by tdd-UL-DL-ConfigurationCommon.

$a_1, a_2, a_3, a_4$ may be determined based on P in pattern 1 as described in Table 1 for $a_0=0$; and/or P in pattern 1 and $P_2$ in pattern 2 as described in Table 2 for $a_0=1$; and $a_5, a_6, a_7, a_8, a_9, a_{10}, a_{11}$ may be the 7th to 1st least significant bits (LSBs) of $u_{slots}^{SL}$, respectively.

TABLE 1

Slot configuration period when one pattern is indicated

| $\alpha_1, \alpha_2, \alpha_3, \alpha_4$ | Slot configuration period of pattern1 P (msec) |
| --- | --- |
| 0, 0, 0, 0 | 0.5 |
| 0, 0, 0, 1 | 0.625 |
| 0, 0, 1, 0 | 1 |
| 0, 0, 1, 1 | 1.25 |
| 0, 1, 0, 0 | 2 |
| 0, 1, 0, 1 | 2.5 |
| 0, 1, 1, 0 | 4 |
| 0, 1, 1, 1 | 5 |
| 1, 0, 0, 0 | 10 |
| Reserved | Reserved |

When $a_0=0$, $$u_{slots}^{SL} = u_{slots} * 2^{\mu-\mu_{ref}} + \left\lfloor \frac{u_{sym} * 2^{\mu-\mu_{ref}}}{L} \right\rfloor + I_1;$$

and when $a_0=1$, $$u_{slots}^{SL} = \left\lfloor \frac{u_{slots,2} * 2^{\mu-\mu_{ref}} + \left\lfloor \frac{u_{sym,2} * 2^{\mu-\mu_{ref}}}{L} \right\rfloor + I_2}{w} \right\rfloor * \left\lceil \frac{P * 2^{\mu} + 1}{w} \right\rceil + \left\lfloor \frac{u_{slots} * 2^{\mu-\mu_{ref}} + \left\lfloor \frac{u_{sym} * 2^{\mu-\mu_{ref}}}{L} \right\rfloor + I_1}{w} \right\rfloor,$$

wherein:

L is the number of symbols in a slot: L=12 if cyclicPrefix-SL="ECP"; else, L=14;

$I_1$ is 1 if $u_{sym} * 2^{\mu-\mu_{ref}}$ mod L≥L−Y, else $I_1$ is 0;

$I_2$ is 1 if $u_{sym,2} * 2^{\mu-\mu_{ref}}$ mod L≥L−Y, else $I_2$ is 0;

Y is the sidelink starting symbol index provided by sl-StartSymbol;

w is the granularity of slots indication as described in Table 2;

$\mu_{ref}$ is a reference SCS configuration by referenceSubcarrierSpacing;

$u_{slots}$ is a number of slots with only uplink symbols in Pattern 1;

$u_{sym}$ is a number of uplink symbols in Pattern 1;

$u_{slots,2}$ is a number of slots with only uplink symbols in Pattern 1;

$u_{sym,2}$ is a number of uplink symbols in Pattern 2; and $\mu=0, 1, 2$, or 3 corresponds to the 15, 30, 60, 120 KHz SL sub-carrier spacing (SCS), respectively.

TABLE 2

Slot configuration period and granularity when two patterns are indicated

| $a_1, a_2, a_3, a_4$ | Slot configuration period of pattern1 P (msec) | Slot configuration period of pattern2 P2 (msec) | Granularity w in slots with different SCS | | | |
| --- | --- | --- | --- | --- | --- | --- |
| | | | 15 kHz | 30 kHz | 60 kHz | 120 kHz |
| 0, 0, 0, 0 | 0.5 | 0.5 | | 1 | | |
| 0, 0, 0, 1 | 0.625 | 0.625 | | | | |
| 0, 0, 1, 0 | 1 | 1 | | | | |
| 0, 0, 1, 1 | 0.5 | 2 | | | | |
| 0, 1, 0, 0 | 1.25 | 1.25 | | | | |
| 0, 1, 0, 1 | 2 | 0.5 | | | | |
| 0, 1, 1, 0 | 1 | 3 | | 1 | | 2 |
| 0, 1, 1, 1 | 2 | 2 | | | | |
| 1, 0, 0, 0 | 3 | 1 | | | | |
| 1, 0, 0, 1 | 1 | 4 | | | | |
| 1, 0, 1, 0 | 2 | 3 | | | | |
| 1, 0, 1, 1 | 2.5 | 2.5 | | | | |
| 1, 1, 0, 0 | 3 | 2 | | | | |
| 1, 1, 0, 1 | 4 | 1 | | | | |
| 1, 1, 1, 0 | 5 | 5 | 1 | | 2 | 4 |
| 1, 1, 1, 1 | 10 | 10 | 1 | 2 | 4 | 8 |

In another embodiment, when two patterns are configured, the indication may be done with a floor operation floor( ). From receiving UE's perspective, various solutions may be used to mitigate the ambiguous to retrieve the (n1, n2) with the received Z bits.

In one implementation, for indication of the UL slots by Z, when a single pattern is configured, Z bits indicate the UL slot number in the pattern is n. When two patterns are configured, Z bits indicate the state index derived by the UL slots, $$n = \left\lfloor \frac{n_2}{w} \right\rfloor * \left\lceil \frac{P*2^\mu + 1}{w} \right\rceil + \left\lfloor \frac{n_1}{w} \right\rfloor,$$

wherein:

n1 is the number of UL slots in the first pattern (pattern 1);

n2 is the number of UL slots in the second pattern (pattern 2);

P is the periodicity in units of ms of the first pattern (patter 1);

w is the granularity of resource indication; and

µ is 0, 1, 2, or 3 corresponds to the 15, 30, 60, 120 KHz SCS for SL, respectively.

In another implementation, for indication of the granularity of UL resources, when a single pattern is configured, the granularity of the number of UL resources indicated by SL-TDD-Config. is 1 slot. When two patterns are configured, the granularity of the number of UL resources indicated by SL-TDD-Config. follows Table 3.

In another implementation, at least Y-th, (Y+1)-th, . . . (Y+X−1)-th symbols in a slot semi-statically for UL as indicated in TDD-UL-DL-ConfigCommon, where X is sl-LengthSymbols and Y is sl-StartSymbol. This slot may be indicated by PSBCH. X and Y in the present disclosure may be different from the X/Y/Z in PSBCH.

In various embodiments, referring to FIG. 4, a method 400 for wireless communication includes synchronizing at least one number of uplink slots for a user equipment (UE) for a sidelink communication. The method 400 may include a portion or all of the following: step 410, determining, by a first UE, at least one number of uplink slots for the sidelink communication between the first UE and a second UE; step 420, transmitting, by the first UE to the second UE, a physical sidelink broadcast channel (PSBCH) message comprising Z bits indicating a state index, Z being a positive integer. For example but not limited to, Z may be 7. The Z bits in the PSBCH message is configured to specify to the second UE the at least one number of uplink slots for the sidelink communication. In one implementation, two patterns may be configured. The at least one number of uplink slots comprises a first number of uplink slots in a first pattern (Pattern 1) and a second number of uplink slots in a second pattern (Pattern 2).

TABLE 3

Slot configuration period and granularity when two patterns are indicated

| Periodicity indication Y | P + P2 (ms) | Two patterns | | Granularity in slots with different SCS | | | |
|---|---|---|---|---|---|---|---|
| | | P | P2 | 15 kHz | 30 kHz | 60 kHz | 120 kHz |
| 0 | 1 | 0.5 | 0.5 | | 1 | | |
| 1 | 1.25 | 0.625 | 0.625 | | | | |
| 2 | 2 | 1 | 1 | | | | |
| 3 | 2.5 | 0.5 | 2 | | | | |
| 4 | 2.5 | 1.25 | 1.25 | | | | |
| 5 | 2.5 | 2 | 0.5 | | | | |
| 6 | 4 | 1 | 3 | | 1 | | 2 |
| 7 | 4 | 2 | 2 | | | | |
| 8 | 4 | 3 | 1 | | | | |
| 9 | 5 | 1 | 4 | | | | |
| 10 | 5 | 2 | 3 | | | | |
| 11 | 5 | 2.5 | 2.5 | | | | |
| 12 | 5 | 3 | 2 | | | | |
| 13 | 5 | 4 | 1 | | | | |
| 14 | 10 | 5 | 5 | 1 | | 2 | 4 |
| 15 | 20 | 10 | 10 | 1 | 2 | 4 | 8 |

In one embodiment, the range to be indicated may be such that mod (n1,w)=0 and mod (n2,w)=0. In this embodiment, the preference of the value range of both patterns includes no remainder bit. In one implementation, partial slot may not be indicated under some cases.

In another implementation, the first number of uplink slots in the first pattern comprises N*w. The second number of uplink slots in the second pattern comprises M*w. N and M are non-negative integer, for example but not limited to, N=3 and M=5. w is a granularity of resource indication.

In another embodiment, the UL slot numbers to be indicated in both patterns (n1, n2) are such that mod (n1,w)=Δ1 and mod (n2,w)=Δ2. In one implementation, the first number of uplink slots in the first pattern comprises N*w+Δ1, and the second number of uplink slots in the second pattern comprises M*w+Δ2. N and M are non-negative integer, for example but not limited to, N=2 and M=5. w is a granularity of resource indication.

In one implementation, the Z bits in the PSBCH message satisfies $$u_{slots}^{SL} = \left\lfloor \frac{u_{slots,2} * 2^{\mu-\mu_{ref}} + \left\lfloor \frac{u_{sym,2} * 2^{\mu-\mu_{ref}}}{L} \right\rfloor + I_2}{w} \right\rfloor * \left\lceil \frac{P * 2^\mu + 1}{w} \right\rceil +$$

$$\left\lfloor \frac{u_{slots} * 2^{\mu-\mu_{ref}} + \left\lfloor \frac{u_{sym} * 2^{\mu-\mu_{ref}}}{L} \right\rfloor + I_1}{w} \right\rfloor,$$

wherein:
P is a periodicity in units of ms of Pattern 1, μ is a non-negative integer corresponding to a subcarrier spacing (SCS) for the sidelink communication,
L is the number of symbols in a slot:
L=12 if cyclicPrefix-SL="ECP"; else, L=14,
$I_1$ is 1 if $u_{sym}*2^{\mu-\mu_{ref}}$ mod L≥L−Y, else $I_1$ is 0,
$I_2$ is 1 if $u_{sym,2}*2^{\mu-\mu_{ref}}$ mod L≥L−Y, else $I_2$ is 0,
Y is a sidelink starting symbol index provided by sl-StartSymbol,
$\mu_{ref}$ is a reference SCS configuration by referenceSubcarrierSpacing,
$u_{slots}$ is a number of slots with only uplink symbols in Pattern 1,
$u_{sym}$ is a number of uplink symbols in Pattern 1,
$u_{slots,2}$ is a number of slots with only uplink symbols in Pattern 1, and
$u_{sym,2}$ is a number of uplink symbols in Pattern 2.

Additionally, in response to the SCS being 15 kHz, the μ is 0; in response to the SCS being 30 kHz, the μ is 1; in response to the SCS being 60 kHz, the μ is 2; and in response to the SCS being 120 kHz, the u is 3.

In various implementations, the values of Δ1 and Δ2 may be further specified by various alternatives.

In one implementation, Δ1 is determined based on Y and w according to at least one of the following: Y mod w; (Y mod w)+1; or 1, where Y is a periodicity indication and is non-negative integer and represented by the 1st to 5th most significant bits (MSBs) in the PSBCH payload.

In another implementation, Δ2 is determined based on Y and w according to at least one of the following: Y mod w; (Y mod w)+1; or 1, where Y is a periodicity indication and is non-negative integer, and represented by the 1st to 5th MSBs in the PSBCH payload.

In another implementation, Δ1 is determined based on w according to at least one of the following: w/2; floor(w/2); or w/k, where k is an integer larger than one. For example but not limited to, k=3.

In another implementation, Δ2 is determined based on w according to at least one of the following formula: w/2; floor(w/2); or w/k, where k is an integer larger than one.

In another implementation, in response to w being larger than one, (Δ1, Δ2) is determined according to at least one of the following: (1, 1); (1, 0); or (0, 1).

In another implementation, (Δ1, Δ2) is determined based on a table comprising (N, M), where N and M are non-negative integer. For example but not limited to, N may be any integer between 0 and 7, inclusive, and/or M may be any integer between 0 and 7. The table may include (0, 1), (0, 2), ... (0, 7), (1, 0), (1, 1), ... (1, 7), (2, 0), ... (7, 7).

In the various implementations described above, some default values may be used if not all the entries are configured in the table.

In another implementation, Δ1 comprises a pre-configured or configured value. Δ2 is determined according to at least one of the following: being same as Δ1; being determined based on a table comprising (N, M), where N and M are non-negative integer; being determined based on any one formula as described in any of the above implementation/embodiment; or a default value of 0.

In another implementation, Δ2 comprises a pre-configured or configured value. Δ1 is determined according to at least one of the following: being same as Δ2; being determined based on a table comprising (N, M), where N and M are non-negative integer; being determined based on any one formula as described in any of the above implementation/embodiment; or a default value of 0.

In another implementation, in response to none of Δ1 and Δ2 being pre-configured or configured, Δ1 and Δ2 are determined to be 0.

In another embodiment, referring to FIG. 5, a method 500 for wireless communication. The method 500 includes step 510: determining, by a second UE, a first number (n1) of uplink slots in a first pattern and a second number (n2) of uplink slots in a second pattern from PSBCH sent by a first UE based on at least one of: a state index from Z bits indicated in PSBCH, a slot indication Δ1, a slot indication Δ2, the slot indication Δ1 and Δ2, a periodicity in units of ms P, a periodicity indication Y, a non-negative integer corresponding to a subcarrier spacing (SCS) for the sidelink communication μ, or a granularity of resource indication w.

In one implementation, in response to two patterns being configured, the at least one number of uplink slots comprises a first number of uplink slots in a first pattern (Pattern 1) and a second number of uplink slots in a second pattern (Pattern 2); and the first number of uplink slots in the first pattern, and the second number of uplink slots in the second pattern are determined based on the Z bits in the PSBCH message satisfying $$u_{slots}^{SL} = \left\lfloor \frac{u_{slots,2} * 2^{\mu-\mu_{ref}} + \left\lfloor \frac{u_{sym,2} * 2^{\mu-\mu_{ref}}}{L} \right\rfloor + I_2}{w} \right\rfloor * \left\lceil \frac{P * 2^\mu + 1}{w} \right\rceil +$$

$$\left\lfloor \frac{u_{slots} * 2^{\mu-\mu_{ref}} + \left\lfloor \frac{u_{sym,2} * 2^{\mu-\mu_{ref}}}{L} \right\rfloor + I_1}{w} \right\rfloor,$$

wherein:
P is a periodicity in units of ms of Pattern 1,
μ is a non-negative integer corresponding to a subcarrier spacing (SCS) for the sidelink communication,
L is a number of symbols in a slot: L=12 if cyclicPrefix-SL="ECP"; else,
L=14,
$I_1$ is 1 if $u_{sym}*2^{\mu-\mu_{ref}}$ mod L≥ L−Y, else $I_1$ is 0,
$I_2$ is 1 if $u_{sym,2}*2^{\mu-\mu_{ref}}$ mod L≥L−Y, else $I_2$ is 0,
Y is the sidelink starting symbol index provided by sl-StartSymbol,
$\mu_{ref}$ is a reference SCS configuration by referenceSubcarrierSpacing,
$u_{slots}$ is a number of slots with only uplink symbols in Pattern 1,
$u_{sym}$ is a number of uplink symbols in Pattern 1,
$u_{slots,2}$ is a number of slots with only uplink symbols in Pattern 1, and
$u_{sym,2}$ is a number of uplink symbols in Pattern 2.

In another implementation, the first number (n1) of uplink slots in the first pattern, and the second number (n2) of uplink slots in the second pattern satisfies at least one of the following: mod (n1,w)=0 and mod (n2,w)=0; mod (n1,w)=1 and mod (n2,w)=1; or mod (n1,w)=0 and mod (n2,w)=1; wherein:

$$n1 = u_{slots} * 2^{\mu-\mu_{ref}} + \left\lfloor \frac{u_{sym} * 2^{\mu-\mu_{ref}}}{L} \right\rfloor + I_1$$

$$n2 = u_{slots,2} * 2^{\mu-\mu_{ref}} + \left\lfloor \frac{u_{sym,2} * 2^{\mu-\mu_{ref}}}{L} \right\rfloor + I_2.$$

In another implementation, a first number of uplink slots in a first pattern comprises mod $$(u_{slots}^{SL}, \left\lceil \frac{P*2^{\mu}+1}{w} \right\rceil) * w + \Delta 1;$$

and a second number of uplink slots in a second pattern comprises $$u_{slots}^{SL} / \left\lceil \frac{P*2^{\mu}+1}{w} \right\rceil + \Delta 2;$$

wherein:
$u_{slots}^{SL}$ is determined based on the Z bits in the PSBCH message,
w is a granularity of resource indication,
P is a periodicity in units of ms of the first pattern, and
µ is a non-negative integer corresponding to a subcarrier spacing (SCS) for the sidelink communication.

In another implementation, in response to two patterns being configured, $u_{slots}^{SL}$ is determined based on $$u_{slots}^{SL} = \left[ \frac{u_{slots,2} * 2^{\mu-\mu_{ref}} + \left\lfloor \frac{u_{sym} * 2^{\mu-\mu_{ref}}}{L} \right\rfloor + I_2}{w} \right] * \left\lceil \frac{P*2^{\mu}+1}{w} \right\rceil + \left[ \frac{u_{slots} * 2^{\mu-\mu_{ref}} + \left\lfloor \frac{u_{sym} * 2^{\mu-\mu_{ref}}}{L} \right\rfloor + I_1}{w} \right].$$

In another implementation, Δ1 is determined based on Y and w according to at least one of the following: Y mod w; (Y mod w)+1; or 1, where Y is a periodicity indication and is non-negative integer. Δ2 is determined based on Y and w according to at least one of the following: Y mod w; (Y mod w)+1; or 1, where Y is a periodicity indication and is non-negative integer.

In another implementation, Δ1 is determined based on w according to at least one of the following: w/2; floor(w/2); or w/k, where k is an integer larger than one. Δ2 is determined based on w according to at least one of the following: w/2; floor(w/2); or w/k, where k is an integer larger than one.

In another implementation, in response to w being larger than one, (Δ1, Δ2) is determined according to at least one of the following: (1, 1); (1, 0); or (0, 1).

In another implementation, (Δ1, Δ2) is determined based on a table according to at least one of the following: (1, 1); (1, 0); (0, 1); (3, 3); (7, 3); or (3, 7).

In another implementation, Δ1 comprises a pre-configured or configured value; and Δ2 is determined according to at least one of the following: being same as Δ1, being determined based on a table, being determined based on a formula, or 0.

In another implementation, Δ2 comprises a pre-configured or configured value; and Δ1 is determined according to at least one of the following: being same as Δ2, being determined based on a table, being determined based on a formula, or 0.

In another implementation, in response to none of Δ1 and Δ2 being pre-configured or configured, Δ1 and Δ2 are determined to be 0.

The present disclosure describes methods, apparatus, and computer-readable medium for wireless communication. The present disclosure addressed the issues with synchronizing at least one number of uplink slots for a user equipment (UE) for a sidelink communication. The methods, devices, and computer-readable medium described in the present disclosure may facilitate the performance of wireless communication by synchronizing at least one number of uplink slots for a user equipment (UE) for a sidelink communication, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for wireless communication, comprising:
synchronizing at least one number of uplink slots for a user equipment (UE) for a sidelink communication by:
determining, by a first UE, at least one number of uplink slots for the sidelink communication between the first UE and a second UE; and
transmitting, by the first UE to the second UE, a physical sidelink broadcast channel (PSBCH) message comprising Z bits indicating a state index, Z being a positive integer, wherein the Z bits in the PSBCH message are configured to specify to the second UE the at least one number of uplink slots for the sidelink communication,
wherein, in response to two patterns being configured:
the at least one number of uplink slots comprises a first number of uplink slots in a first pattern (Pattern 1) and a second number of uplink slots in a second pattern (Pattern 2),
the first number of uplink slots in the first pattern comprises N*w+Δ1, and
the second number of uplink slots in the second pattern comprises M*w+Δ2, wherein: N and M are non-negative integers, Δ1 and Δ2 are integers, and w is a granularity of resource indication, and
in response to Δ1 and Δ2 being determined based on a table, the table comprises (P, Q), where P being between 0 and 7 inclusive and Q being between 0 and 7 inclusive.

2. The method according to claim 1, wherein:
in response to Δ1 being determined based on Y and w, Δ1 is determined according to at least one of the following:
Y mod w;
(Y mod w)+1; or
1, where Y is a periodicity indication and is non-negative integer and represented by the 1st to 5th most significant bits (MSBs) in a PSBCH payload.

3. The method according to claim 1, wherein:
in response to Δ2 is determined based on Y and w, Δ2 is determined according to at least one of the following:
Y mod w;
(Y mod w)+1; or
1, where Y is a periodicity indication and is non-negative integer and represented by the 1st to 5th MSBs in a PSBCH payload.

4. The method according to claim 1, wherein:
in response to Δ1 is determined based on w, Δ1 is determined according to at least one of the following:
w/2;
floor(w/2); or
w/k, where k is an integer larger than one.

5. The method according to claim 1, wherein:
in response to Δ2 is determined based on w, Δ2 is determined according to at least one of the following formula:
w/2;
floor(w/2); or
w/k, where k is an integer larger than one.

6. The method according to claim 1, wherein: in response to w being larger than one, (Δ1, Δ2) is determined according to at least one of the following: (1, 1); (1, 0); or (0, 1).

7. The method according to claim 1, wherein:
(Δ1, Δ2) is determined based on the table comprising at least one of the following:
(0, 1);
(0,2);
(0,3);
(0,4);
(0,5);
(0,6);
(0,7);
(1,0);
(1,1);
(1,2);
(1,3);
(1,4);
(1,5);
(1,6);
(1,7);
(2,0);
(2,1);
(2,2);
(2,3);
(2,4);
(2,5);
(2,6);
(2,7);
(3,0);
(3,1);
(3,2);
(3, 3);
(3,4);
(3,5);
(3,6);
(3,7);
(4,0);
(4,1);
(4,2);
(4,3);
(4,4);
(4,5);
(4,6);
(4,7);
(5,0);
(5,1);
(5,2);
(5,3);
(5,4);
(5,5);
(5,6);
(5,7);
(6,0);
(6,1);
(6,2);
(6,3);
(6,4);
(6,5);
(6,6);
(6,7);
(7,0);
(7,1);
(7,2);
(7,3);
(7,4);
(7,5);
(7,6); or
(7,7).

8. The method according to claim 1, wherein: Δ1 comprises a pre-configured or configured value; and Δ2 is determined according to at least one of the following: being same as Δ1, being determined based on the table as in claim 7, being determined based on the formula as in claim 5, or a default value of 0.

9. The method according to claim 1, wherein: Δ2 comprises a pre-configured or configured value; and Δ1 is determined according to at least one of the following: being same as Δ2, being determined based on the table as in claim 7, being determined based on the formula as in claim 5, or a default value of 0.

10. The method according to claim 1, wherein: Δ1 comprises a pre-configured or configured value; and Δ2 comprises a pre-configured or configured value.

11. The method according to claim 1, wherein: in response to none of Δ1 and Δ2 being pre-configured or configured, Δ1 and Δ2 are determined to be 0.

12. An apparatus comprising:
a memory storing instructions; and
a processor in communication with the memory, wherein, when the processor executes the instructions, the processor is configured to cause the apparatus to perform:
synchronizing at least one number of uplink slots for a user equipment (UE) for a sidelink communication by:
determining at least one number of uplink slots for the sidelink communication between the apparatus and the UE; and transmitting, to the UE, a physical sidelink broadcast channel (PSBCH) message comprising Z bits indicating a state index, Z being a positive integer, wherein the Z bits in the PSBCH message are configured to specify to the UE the at least one number of uplink slots for the sidelink communication, wherein, in response to two patterns being configured:
the at least one number of uplink slots comprises a first number of uplink slots in a first pattern (Pattern 1) and a second number of uplink slots in a second pattern (Pattern 2),
the first number of uplink slots in the first pattern comprises $N*w+\Delta 1$, and
the second number of uplink slots in the second pattern comprises $M+w+\Delta 2$,
wherein:
N and M are non-negative integers, $\Delta 1$ and $\Delta 2$ are integers, and w is a granularity of resource indication, and
in response to $\Delta 1$ and $\Delta 2$ being determined based on a table, the table comprises (P, Q), where P being between 0 and 7 inclusive and Q being between 0 and 7 inclusive.

13. The apparatus according to claim 12, wherein:
in response to $\Delta 1$ is determined based on Y and w, $\Delta 1$ is determined according to at least one of the following:
Y mod w;
(Y mod w)+1; or
1, where Y is a periodicity indication and is non-negative integer and represented by the 1st to 5th most significant bits (MSBs) in a PSBCH payload.

14. The apparatus according to claim 12, wherein:
in response to $\Delta 2$ is determined based on Y and w, $\Delta 2$ is determined according to at least one of the following:
Y mod w;
(Y mod w)+1; or
1, where Y is a periodicity indication and is non-negative integer and represented by the 1st to 5th MSBs in a PSBCH payload.

15. A non-transitory computer-readable medium storing instructions, wherein, the instructions, when executed by a processor in an apparatus, are configured to cause the processor to perform:
synchronizing at least one number of uplink slots for a user equipment (UE) for a sidelink communication by:
determining at least one number of uplink slots for the sidelink communication between the apparatus and the UE; and
transmitting, to the UE, a physical sidelink broadcast channel (PSBCH) message comprising Z bits indicating a state index, Z being a positive integer, wherein the Z bits in the PSBCH message are configured to specify to the UE the at least one number of uplink slots for the sidelink communication,
wherein, in response to two patterns being configured:
the at least one number of uplink slots comprises a first number of uplink slots in a first pattern (Pattern 1) and a second number of uplink slots in a second pattern (Pattern 2),
the first number of uplink slots in the first pattern comprises $N*w+\Delta 1$, and
the second number of uplink slots in the second pattern comprises $M*w+\Delta 2$,
wherein:
N and M are non-negative integers, $\Delta 1$ and $\Delta 2$ are integers, and w is a granularity of resource indication, and
in response to $\Delta 1$ and $\Delta 2$ being determined based on a table, the table comprises (P, Q), where P being between 0 and 7 inclusive and Q being between 0 and 7 inclusive.

* * * * *